(12) United States Patent
Niitsuma (10) Patent No.: US 10,412,942 B2
(45) Date of Patent: Sep. 17, 2019

(54) DUAL-BEARING REEL

(71) Applicant: Shimano Inc., Sakai, Osaka (JP)

(72) Inventor: Akira Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/184,060

(22) Filed: Nov. 8, 2018

(65) Prior Publication Data

US 2019/0191683 A1    Jun. 27, 2019

(30) Foreign Application Priority Data

Dec. 27, 2017  (JP) .................................. 2017-250332

(51) Int. Cl.
*A01K 89/01* (2006.01)
*A01K 89/0155* (2006.01)

(52) U.S. Cl.
CPC .............................. *A01K 89/01557* (2015.05)

(58) Field of Classification Search
CPC .............. A01K 89/015; A01K 89/0155; A01K 89/0192; A01K 89/01922; A01K 89/0193
See application file for complete search history.

(56) References Cited

U.S. PATENT DOCUMENTS

| | | | | |
|---|---|---|---|---|
| 5,037,039 A * | 8/1991 | Toda ................ | A01K 89/01921 | 242/223 |
| 6,095,444 A * | 8/2000 | Miyazaki ........... | A01K 89/0183 | 242/312 |
| 8,235,320 B2 * | 8/2012 | Kawasaki .......... | A01K 89/0192 | 242/310 |
| 9,072,284 B2 * | 7/2015 | Hyun ................ | A01K 89/01923 | |
| 9,198,407 B2 * | 12/2015 | Hyun .................. | A01K 89/015 | |
| 9,215,865 B2 * | 12/2015 | Niitsuma ............ | A01K 89/015 | |
| 9,918,458 B2 * | 3/2018 | Umezawa .......... | A01K 89/0192 | |
| 2004/0079822 A1 * | 4/2004 | Kawasaki ........ | A01K 89/01931 | 242/322 |
| 2005/0224617 A1 * | 10/2005 | Nakagawa ....... | A01K 89/01922 | 242/310 |
| 2007/0246590 A1 * | 10/2007 | Hyun ................ | A01K 89/0192 | 242/310 |

(Continued)

FOREIGN PATENT DOCUMENTS

| | | |
|---|---|---|
| JP | 10-56927 A | 3/1998 |
| JP | 10-210902 A | 8/1998 |
| JP | 2014-176301 A | 9/2014 |

*Primary Examiner* — Emmanuel M Marcelo
(74) *Attorney, Agent, or Firm* — Global IP Counselors, LLP (57) ABSTRACT

A dual-bearing reel includes a cover and a dial disc including an engagement groove having a first radius centered on the central shaft, and capable of adjusting a braking force of the spool is formed. A projection is fixed to a first side plate, and engages the engagement groove when the cover covers the first side plate. A guide groove is formed on the dial disc, which extends in a direction that is different from that of the arc of the engagement groove and is in communication with the engagement groove, and through which the projection is capable of passing and being detached from the dial disc. The projection is configured to be detached from the dial disc through the guide groove when the intersection point between the engagement groove and the guide groove is aligned with the projection and when the cover covers the first side plate.

4 Claims, 10 Drawing Sheets

(56) References Cited

U.S. PATENT DOCUMENTS

| | | | |
|---|---|---|---|
| 2010/0038464 A1* | 2/2010 | Nakagawa | A01K 89/01931 |
| | | | 242/321 |
| 2014/0263792 A1* | 9/2014 | Takechi | A01K 89/015 |
| | | | 242/257 |
| 2016/0212981 A1* | 7/2016 | Niitsuma | A01K 89/01556 |

* cited by examiner

DUAL-BEARING REEL

CROSS-REFERENCE TO RELATED APPLICATIONS

This application claims priority to Japanese Patent Application No. 2017-250332, filed on Dec. 27, 2017. The entire disclosure of Japanese Patent Application No. 2017-250332 is hereby incorporated herein by reference.

BACKGROUND

Field of the Invention

The present invention relates to a dual-bearing fishing reel.

Background Art

Dual-bearing reels having a cover that is on one side opposite to a handle of a reel body of a fishing reel and which is capable of being rotated and opened, are in practical use. For example, Japanese Published Unexamined Application No. Hei 10(1998)-56927 discloses a fishing reel having a frame, a spool, a side cover assembly, and a cooperating means, wherein the spool is movable in a first axial direction between an operating position that is held by the frame so as to be rotatable about a first axis and a separated position that is separated from the frame. The cooperating means attaches the side cover assembly to the frame so as to be turnable about a second axis between a first position and a second position. In the first position, the side cover assembly maintains the spool in the operating position, and, in the second position, the side cover assembly permits the spool to move from the operating position to the separated position. In the fishing reel of Japanese Published Unexamined Application No. Hei 10(1998)-56927, a latch assembly is disposed in order to prevent the side cover assembly from being inadvertently separated from the frame.

The reel body of the dual-bearing reel according to Japanese Published Unexamined Application No. Hei 10(1998)-210902 comprises a pair of side plates, a plurality of connecting members, a pair of side covers, and a front cover. The side plates are disposed spaced apart from each other, and an opening through which the spool can extend is formed in one of the side plates. The connecting member connects the two side plates. The side covers cover the respective side plates, and one of the side covers is detachable by being turned with respect to the side plate by a bayonet mechanism. The front cover is mounted to the side plate so as to be openable/closable between a closed position, which covers at least the space between the pair of side plates, and an open position, which is separated from the side plates, and stops the rotation of the side cover when in the closed position. In the dual-bearing reel of Japanese Published Unexamined Application No. Hei 10(1998)-210902, a space is required in which a projection that protrudes from the side cover and a shaft portion that extends from the front cover engage each other.

In the dual-bearing reel of Japanese Published Unexamined Application No. 2014-176301, an attachment/detachment operating part for carrying out the attachment/detachment of a first side cover has a projecting portion that protrudes toward a first side plate. The attachment/detachment operating part pivots between a first position in which the first side cover is detachable with respect to the first side plate and a second position in which the first side cover is not detachable. A lock member has an engagement groove that can be engaged by the projecting portion. The engagement groove has an open first end and a closed second end. The lock member can move between a locked position and a release position. When in the second position the attachment/detachment operating part regulates the movement of the projecting portion in a state in which the attachment/detachment operating part is engaged by the projecting portion, and when in the first position the attachment/detachment operating part permits the movement of the projecting portion.

A dual-bearing reel having a detachable cover is provided with a mechanism for immovably locking the cover in order to prevent the accidental rotation and detachment of the cover. In the technology of the cited documents, a space in the reel body is required for a lock mechanism to prevent the cover from moving.

SUMMARY

The present invention was made to solve the problem described above, and an object thereof is to eliminate the space in the dual-bearing reel that is required for the mechanism that locks the rotatably openable/closable cover.

The dual-bearing reel according to a first aspect of the present invention comprises a frame having a first side plate and a second side plate that is disposed facing the first side plate, a spool shaft, a spool, a cover, a dial disc and a protrusion. The spool shaft is disposed to pass through the first side plate and the second side plate and is rotatably supported by the frame. The spool is configured for line-winding and is mounted on the spool shaft and that is disposed between the first side plate and the second side plate and rotates with the spool shaft. The cover is pivotally supported about a support shaft and is located outside of the frame on the side of the first side plate and is pivotable between a first position, which covers the outside of the frame of the first side plate, and a second position, which opens the outside of the frame of the first side plate. The dial disc is rotatably supported around a central shaft, which is separated from the support shaft of the cover, and is disposed on one of either the cover or the first side plate outside of the frame on the side of the first side plate. The dial disc includes an engagement groove formed thereon, the engagement groove is formed in an arc, and has a first radius centered on the central shaft, and capable of adjusting the braking force that is applied to the spool based on a turning position about the center axis. The dial disc further includes a guide groove which extends from an intersection point of the engagement groove in a direction that is different from the arcuate direction of the engagement groove.

The protrusion is disposed on the other one of the cover and the first side plate at the outside of the frame, and is configured to engage the engagement groove when the cover is in the first position, and configured to detach from the dial disc to disengage the engagement groove through the guide groove when the protrusion is aligned with the intersection point of the engagement groove.

Preferably, the guide groove is an arcuate groove having a second radius centered around the support shaft of the cover that communicates with the engagement groove and with the outer periphery of the dial disc, in a state in which the position where the engagement groove of the dial disc and the guide groove intersect is aligned with the projection when the cover is in the first position.

Preferably, the first side plate has an opening that is formed in a circular shape centered on the axis of the spool shaft such that the spool can pass therethrough, the dual-bearing reel has a shaft supporting part detachably provided in the opening of the first side plate so as to be pivotable about the spool shaft and that can accommodate a shaft bearing that rotatably supports one end of the spool shaft, the cover is fixed to the shaft supporting part, the dial disc is rotatably supported by the shaft supporting part, and the projection is fixed to the first side plate.

Alternatively, the projection has a shape that is thicker toward the end, whereby the width of the distal end is greater than the width of the proximal end, a cross section of the engagement groove has a shape that is wider toward the bottom, whereby the width at the bottom with which the projection engages is greater than the width of the opening, and the guide groove communicates with the engagement groove and with the outer periphery of the dial disc from one location of the engagement groove, and the distal end of the projection can pass through the guide groove in the direction from the distal end to the proximal end of the thereof.

By the present invention it is possible to eliminate the space in the dual-bearing reel that is required for the mechanism that locks the rotatably openable/closable cover.

DETAILED DESCRIPTION OF THE EMBODIMENTS

An embodiment of the present invention will be described in detail below with reference to the drawings. Portions that are the same as or equivalent to the first embodiment have been assigned the same reference symbols.

First Embodiment

Figure 1:
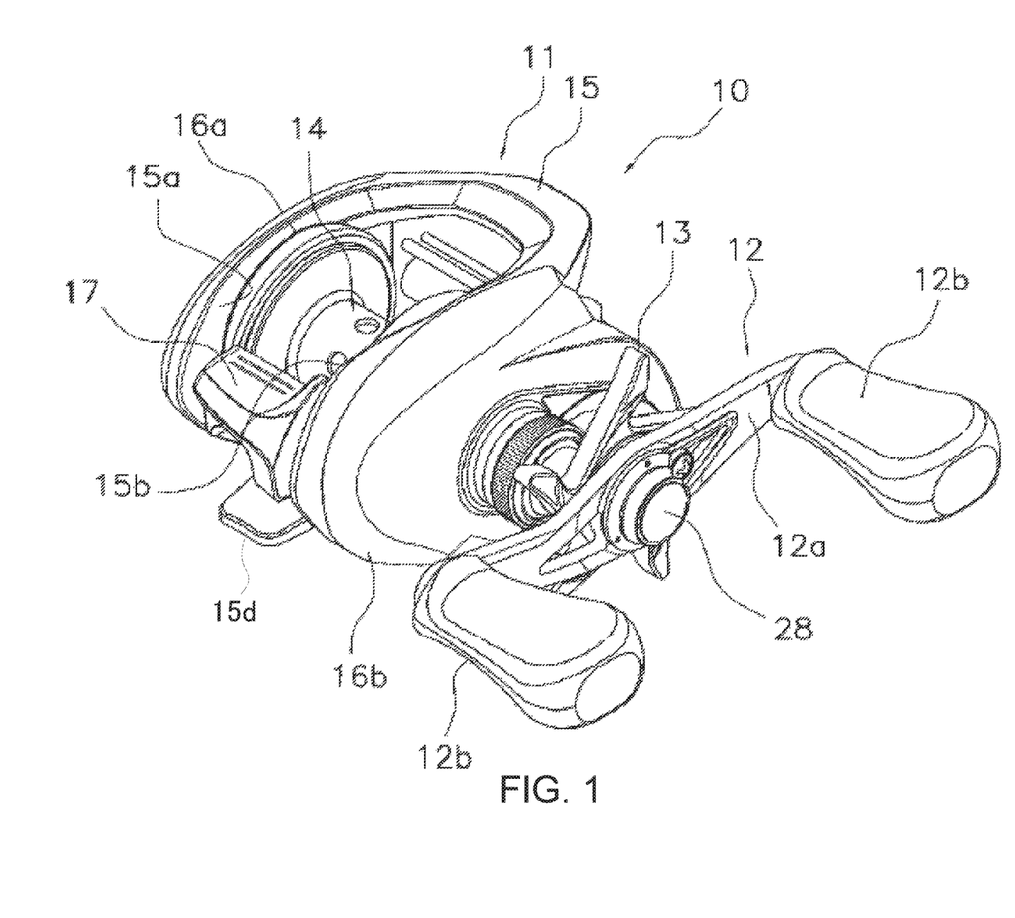
FIG. 1 is an external perspective view of a dual-bearing reel according to a first embodiment of the present invention.

FIG. 1 is an external perspective view of the dual-bearing reel according to a first embodiment of the present invention. The dual-bearing reel 10 comprises a reel body 11, a spool rotary drive handle 12, which is disposed on a side of the reel body 11, a star drag 13, for adjustment of the drag, which is disposed between the handle 12 and the reel body 11, and a spool 14 for winding a fishing line. The spool 14 is mounted on a spool shaft that is rotatably supported by the reel body 11.

The reel body 11 comprises a frame 15, and a cover 16a and a drive unit cover 16b, which are mounted on the two sides of the frame 15. The cover 16a is detachably mounted on a first side plate 15a on the side opposite to the handle 12 and covers the outside of the frame 15 on the side of the first side plate 15a. The drive unit cover 16b is screwed and fixed to a second side plate 15b on the side of the handle 12 and covers the outside of the frame 15 on the side of the second side plate 15b.

The handle 12 is a double-handle type handle, having an arm portion 12a and grips 12b that are rotatably mounted on both ends of the arm portion 12a. A nut 28 is used to fasten the arm portion 12a to the drive shaft of a mechanism for rotationally driving the spool 14.

The dual-bearing reel 10 is mounted on a fishing rod by a fishing rod mounting portion 15d that is formed on the lower portion of the frame 15. The fishing line that is wound around the spool 14 is unreeled (cast) in the right rear direction of FIG. 1. With respect to FIG. 1, the right rear side of the reel body 11 in FIG. 1 is referred to as the front and the left front side is referred to as the rear.

Figure 2:
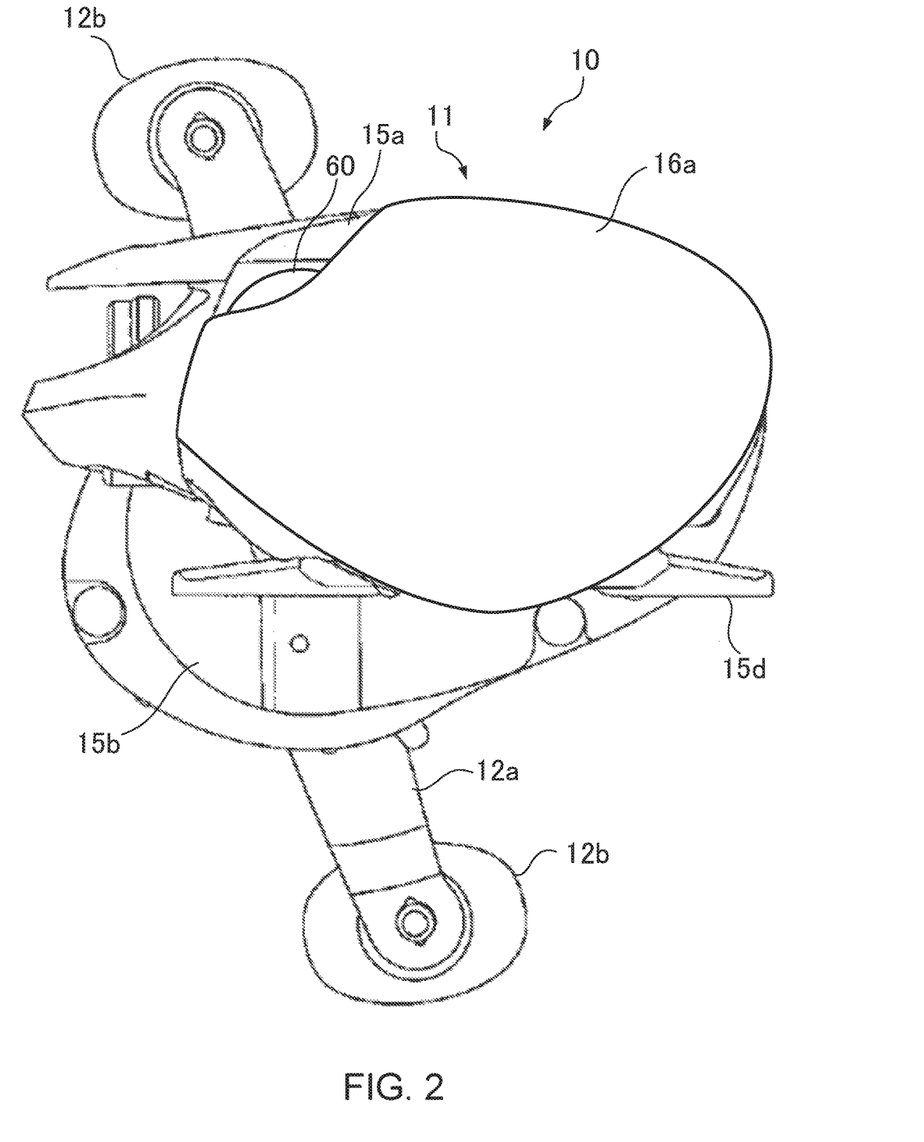
FIG. 2 is a side view of the dual-bearing reel according to the first embodiment.

FIG. 2 is a side view of the dual-bearing reel according to the first embodiment. The view of FIG. 2 is seen from the side of the cover 16a. With respect to FIG. 2, the left is the front and the right is the rear of the dual-bearing reel 10. Since the frame 15 holds a drive mechanism and a drive shaft to which the handle 12 is fixed, the second side plate 15b protrudes farther toward the fishing rod side than the first side plate 15a.

A dial disc 60, which is an operating member that can adjust the braking force that is applied to the spool 14, is disposed between the first side plate 15a and the cover 16a. The dial disc 60 is supported so as to be rotatable with respect to the first side plate 15a and the cover 16a. The cover 16a can be removed from the first side plate 15a when the dial disc 60 is turned to a release position. When the position of the dial disc 60 is turned so as to be within range to adjust the braking force, the cover 16a cannot be removed.

Figure 3:
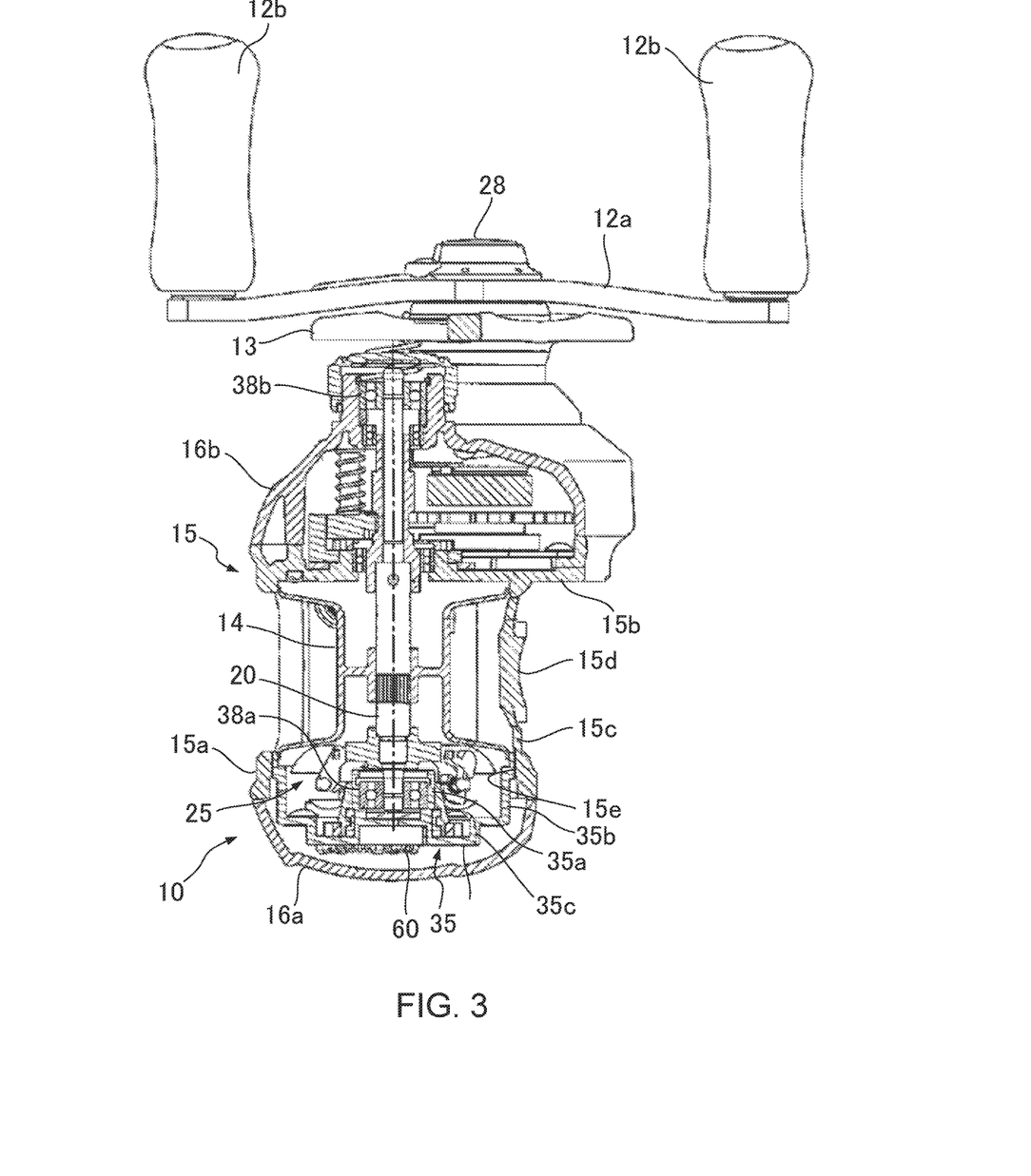
FIG. 3 is a cross-sectional view of the dual-bearing reel according to the first embodiment.

FIG. 3 is a cross-sectional view of the dual-bearing reel according to the first embodiment. FIG. 3 shows a section through a spool shaft 20 with the dual-bearing reel 10 can be seen from the rear. The frame 15 comprises the first side plate 15a, the second side plate 15b, spaced apart from and opposing the first side plate 15a, and a plurality of connecting portions 15c, which connect the first side plate 15a and the second side plate 15b. The fishing rod mounting portion 15d is integrally formed on the connecting portion 15c on the lower side.

The spool shaft 20 passes through the first side plate 15a and the second side plate 15b, and both ends thereof are respectively supported by shaft bearings 38a, 38b so as to be rotatable. The shaft bearing 38a on the side of the first side plate 15a is accommodated in a shaft supporting part 35, and the shaft bearing 38b on the side of the handle 12 is accommodated in the drive unit cover 16b. The spool 14 is disposed between the first side plate 15a and the second side plate 15b, and mounted on the spool shaft 20. The spool 14 rotates together with the spool shaft 20. An opening portion 15e, through which the spool 14 can pass in the direction of the spool shaft 20, is formed on the first side plate 15a. The shaft supporting part 35 is detachably connected to the opening portion 15e of the first side plate 15a.

The shaft supporting part 35 is a tubular member having a bottom. The shaft supporting part 35 has a small-diameter shaft bearing housing portion 35a in which the shaft bearing 38a for supporting one end of the spool shaft 20 is housed, a large-diameter mounting portion 35b that is fitted in the opening portion 15e, and a stepped disc-shaped bottom portion 35c that connects the shaft bearing housing portion 35a and the mounting portion 35b. The shaft bearing 38a is housed in an inner peripheral side of the shaft bearing housing portion 35a.

A spool braking device 25 for suppressing backlash during casting is disposed between the spool 14 and the shaft supporting part 35. The spool braking device 25 is connected to an outer peripheral side of the shaft bearing housing portion 35a. The spool braking device 25 is connected to and held by the shaft supporting part 35 and can be attached to/detached from the first side plate 15a integrally with the shaft supporting part 35. The dial disc 60 is rotatably supported by the shaft supporting part 35. The cover 16a is fixed to the shaft supporting part 35. The dial disc 60 is thus supported between the first side plate 15a and the cover 16a on the cover 16a side.

Figure 4:
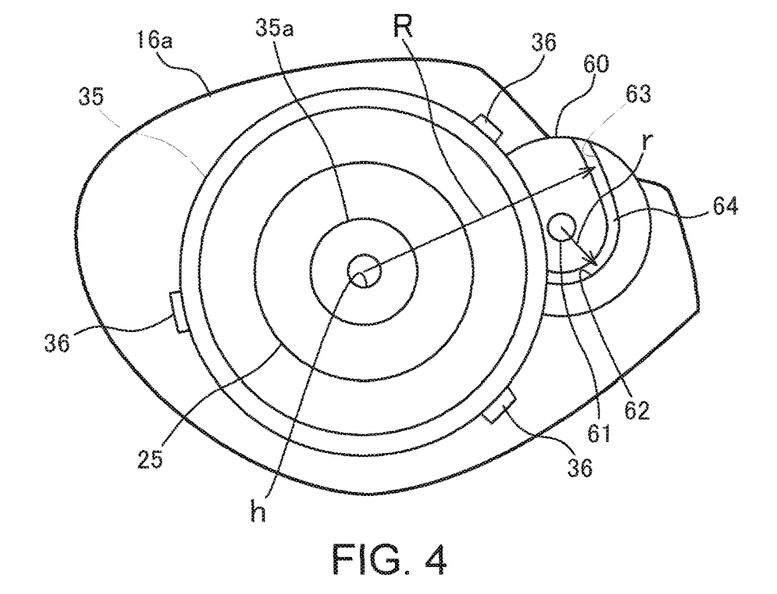
FIG. 4 is a rear view of a cover of the dual-bearing reel according to the first embodiment.

FIG. 4 is a rear view of the cover 16a of the dual-bearing reel according to the first embodiment. FIG. 4 is a view of the cover 16a, the shaft supporting part 35, and the dial disc 60, which are integrated, as seen from the side of the first side plate 15a. With respect to FIG. 4, the right is the front and the left is the rear of the dual-bearing reel 10. In FIG. 4, the spool braking device 25 is drawn in a simplified manner. The cover 16a can be fixed to the shaft supporting part 35 with a screw, for example, which is not shown.

A plurality of cam protrusions 36 that protrude in the radial direction are formed on the outer periphery of the shaft supporting part 35 at intervals in the circumferential direction. The cam protrusions 36 are connected to cam receivers that are formed in the opening portion 15e of the first side plate 15a by a bayonet structure. The spool shaft 20 fits into a hole h in the center of the shaft supporting part 35. The shaft supporting part 35 is supported by the first side plate 15a so as to be pivotable about the spool shaft 20.

The dial disc 60 is rotatably supported around a central shaft 61, and has an engagement groove 62 and a guide groove 63. The engagement groove 62 is formed as an arc with a radius r centered on the axis of the central shaft 61 is formed on the dial disc 60. The radius r is the radius of a circle that is centered at the axis of the central shaft 61 and that passes through the center of the engagement groove 62. The guide groove 63 has a radius R centered at the center of the central hole h, that is, centered at the support shaft of the shaft supporting part 35, and that extends from an intersection point 64 of the engagement groove 62, is also formed on the dial disc 60. The radius R is the radius of the circle that is centered at the support shaft of the shaft supporting part 35 and that passes through the center of gravity of the cross section of the guide groove 63. The guide groove 63 communicates with the engagement groove 62 and with the outer periphery of the dial disk 60. The engagement groove 62 and the guide groove 63 intersect and communicate with each other at the intersection point 64.

Figure 5:
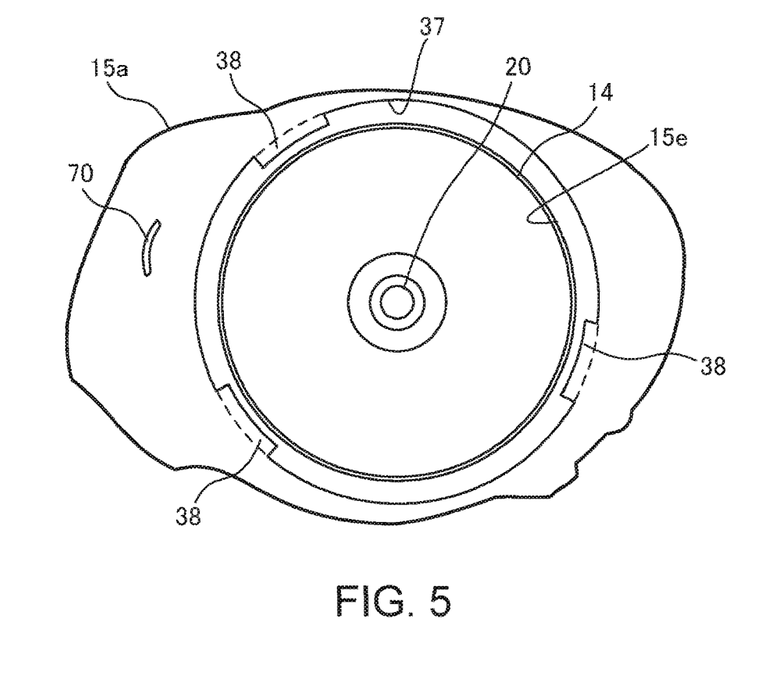
FIG. 5 is a front view of a first side plate in which the cover has been removed from the dual-bearing reel according to the first embodiment.

FIG. 5 is a front view the first side plate, where the cover has been removed from the dual-bearing reel according to the first embodiment. With respect to FIG. 5, the left is the front and the right is the rear of the dual-bearing reel 10. Since the cover 16a, the shaft supporting part 35, the spool braking device 25, and the dial disc 60 are integrally removed from the first side plate 15a when the cover 16a is removed, the shaft supporting part 35, the spool braking device 25, and the dial disc 60 are also removed.

When the cover 16a, the shaft supporting part 35, the spool braking device 25, and the dial disc 60 are removed, the spool 14 and the spool shaft 20 are visible through the opening portion 15e. An engagement groove 37 that can be engaged by the cam protrusions 36 is formed in the periphery of the opening portion 15e, and cam receivers 38 are formed in a plurality of locations (for example, three locations) at intervals in the circumferential direction. When the cam protrusions 36 of the shaft supporting part 35 are engaged with the engagement groove 37 and turned around the spool shaft 20, the cam protrusions 36 fit into the cam receivers 38, and the shaft supporting part 35 is connected to the first side plate 15a.

A projection 70 that protrudes toward the cover 16a is fixed to the first side plate 15a. When the cover 16a, the shaft supporting part 35, and the dial disc 60 are attached to the first side plate 15a, the projection 70 engages the guide groove 63 or the engagement groove 62 of the dial disc 60.

Figure 6:
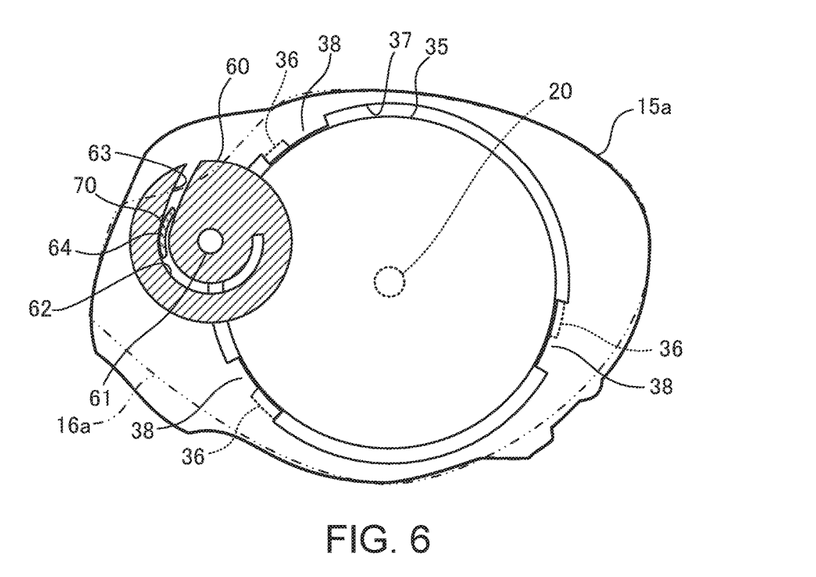
FIG. 6 is a cross-sectional view taken through an engagement groove in a released state of the dual-bearing reel according to the first embodiment.

FIG. 6 is a cross-sectional view taken through the engagement groove in the released state of the dual-bearing reel according to the first embodiment. FIG. 6 shows a section through the engagement groove 62, orthogonal to the spool shaft 20 as seen from the cover 16a toward the first side plate 15a. With respect to FIG. 6, the left is the front and the right is the rear of the dual-bearing reel 10. In FIG. 6, the cover 16a is indicated by a chain double-dashed line. FIG. 6 shows a state in which the intersection point 64 of the engagement groove 62 of the dial disc 60 and the guide groove 63 is aligned with the projection 70 in a closed state in which the cover 16a covers the first side plate 15a, that is, the unlocked state.

The projection 70 engages the engagement groove 62 in the closed state in which the cover 16a covers the first side plate 15a. Since the engagement groove 62 is an arcuate groove centered at the central shaft 61 of the dial disc 60, it is possible to turn the dial disc 60 about the central shaft 61, in the closed state in which the cover 16a covers the first side plate 15a. Since the guide groove 63 is an arcuate groove centered at the spool shaft 20, which is the support shaft of the shaft supporting part 35, it is possible to integrally pivot the cover 16a, the shaft supporting part 35, and the dial disc 60 about the spool shaft 20 to detach the projection 70 from the dial disc 60, when the intersection point 64 is aligned with the projection 70.

Figure 7:
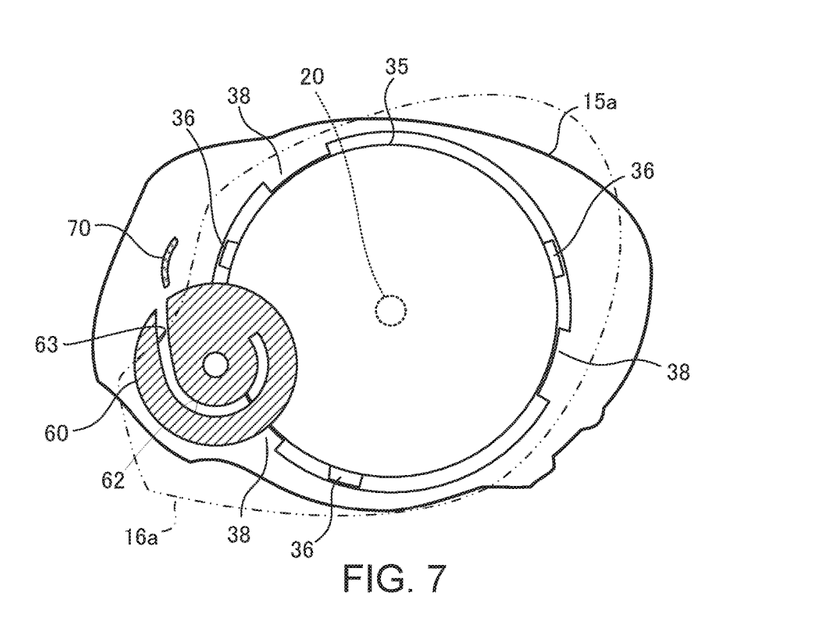
FIG. 7 is a cross-sectional view taken through the engagement groove when the cover of the dual-bearing reel according to the first embodiment is opened.

FIG. 7 is a cross-sectional view taken through the engagement groove when the cover of the dual-bearing reel according to the first embodiment is opened. In the unlocked state of FIG. 6, it is possible to turn the dial disc 60 about the support shaft of the shaft supporting part 35 to detach the projection 70 from the dial disc 60. When the cover 16a, the shaft supporting part 35, and the dial disc 60 are integrally pivoted in the counterclockwise direction in FIG. 7, the projection 70 is detached from the dial disc 60 via the guide groove 63, and the cam protrusions 36 of the shaft supporting part 35 are detached from the cam receivers 38 of the first side plate 15a. Since there is nothing to hold the cam protrusions 36, it is possible to remove the shaft supporting part 35 in the direction of the spool shaft 20. Since the cover 16a is fixed to the shaft supporting part 35, the outside of the frame 15 of the first side plate 15a is opened.

Figure 8:
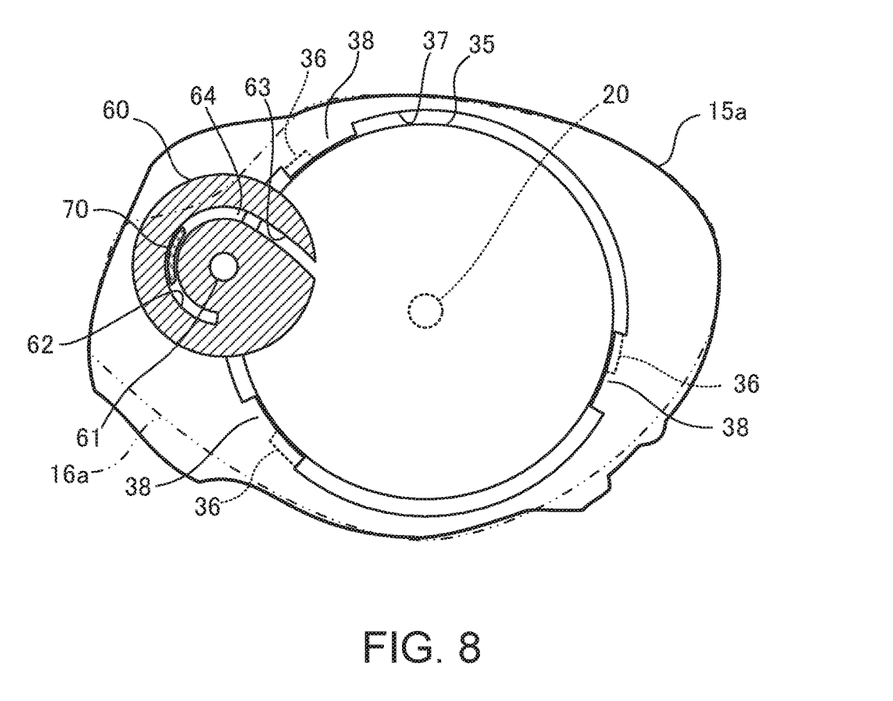
FIG. 8 is a cross-sectional view taken through the engagement groove in a locked state of the dual-bearing reel according to the first embodiment.

FIG. 8 is a cross-sectional view taken through the engagement groove in the locked state of the dual-bearing reel according to the first embodiment. It is possible to turn the dial disc 60 about the central shaft 61 when the cover 16a is closed and release the lock, as shown in FIG. 6. When the dial disc 60 is turned clockwise about the central shaft 61 from the position where the intersection point 64 is aligned with the projection 70, the dial disc 60 is restrained by the projection 70 and the engagement groove 62, and the dial disc 60 cannot be pivoted about the support shaft of the shaft supporting part 35. That is, the cover 16a cannot be turned. Since the cam protrusions 36 of the shaft supporting part 35 are held by the cam receivers 38 of the first side plate 15a, the shaft supporting part 35 and the cover 16a cannot be removed from the first side plate 15a.

According to the dual-bearing reel 10 of the first embodiment, the engagement groove 62 and the guide groove 63 are formed on the dial disc 60, which adjusts the braking force that is applied to the spool 14, and the projection 70 that engages the engagement groove 62 and the guide groove 63 is formed on the first side plate 15a; therefore, a space for a dedicated mechanism that locks the cover 16a is not required.

The orientation of the guide groove 63 is not limited to the orientations shown in FIG. 4 and FIGS. 6 to 8, and the guide groove may communicate with the outer periphery of the dial disc 60 from the other end of the engagement groove 62. In this embodiment, the shaft supporting part 35 is pivoted clockwise, as seen from the cover 16a, toward the first side plate 15a, in order to detach the cam protrusions 36 from the cam receivers 38, and then pivoted counterclockwise to connect the shaft supporting part 35 to the first side plate 15a. Additionally, the guide groove 63 is not limited to communicating only with the end of the engagement groove 62, and may communicate with the engagement groove 62 from the middle of the engagement groove 62.

Second Embodiment

Figure 9:
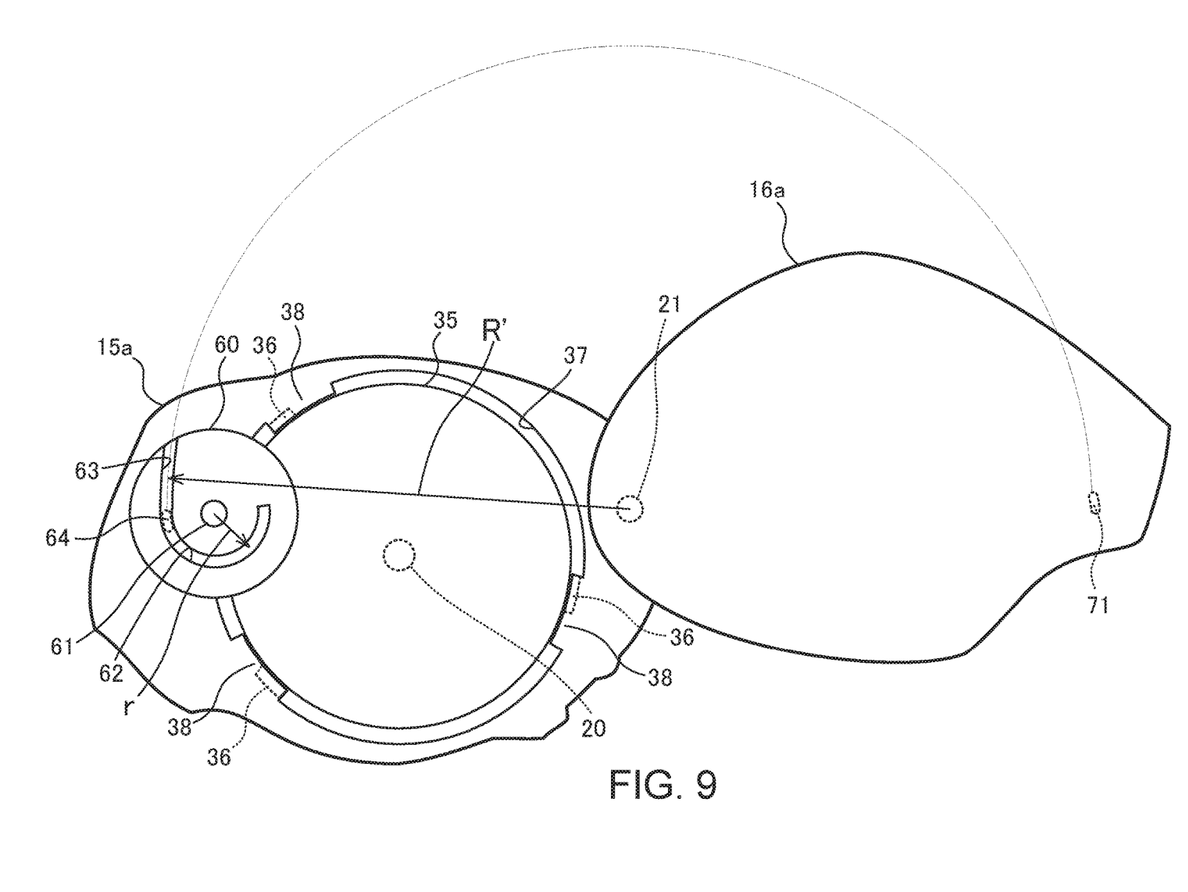
FIG. 9 is a side view in a state in which the cover of the dual-bearing reel according to a second embodiment of the present invention is opened.

FIG. 9 is a side view of the dual-bearing reel according to a second embodiment of the present invention with the cover open. In the second embodiment, the engagement groove 62 of the dial disc 60 and a projection 71 that engages with the guide groove 63 are formed on the cover 16a. The cover 16a is supported by the first side plate 15a so as to be pivotable about a support shaft 21. The cover 16a is not fixed to the shaft supporting part 35.

In the same manner as in the first embodiment, the shaft supporting part 35 is connected to the first side plate 15a by the cam protrusions 36, the engagement groove 37, and the cam receivers 38, which have a bayonet structure. The dial disc 60 is rotatably supported by the shaft supporting part 35. The dial disc 60 is supported between the first side plate 15a and the cover 16a on the side of the first side plate 15a.

In the same manner as in the first embodiment, an engagement groove 62 with a radius r centered at the axis of the central shaft 61 is formed on the dial disc 60. The guide groove 63 with a radius R' centered at the support shaft 21 of the cover 16a, and that communicates with the engagement groove 62 from the end of the engagement groove 62, is also formed on the dial disc 60. The guide groove 63 communicates with the engagement groove 62 and with the outer periphery of the dial disk 60. The engagement groove 62 and the guide groove 63 intersect and communicate with each other at the intersection point 64. Since the projection 71 is fixed to the cover 16a, the engagement groove 62 and the guide groove 63 are open onto a surface of the dial disc 60 on the cover 16a side.

The relationship between the projection 71, the guide groove 63, and the engagement groove 62 of the dial disc 60 when viewed in a cross section taken through the engagement groove 62 is the same as the relationship between the projection 70, the guide groove 63, and the engagement hole 62 in the first embodiment. In the second embodiment, from the released state, the cover 16a pivots about the support shaft 21, and the projection 71 is detached from the dial disc 60. As shown in FIG. 9, the outside of the frame 15 on the side of the first side plate 15a can be opened by pivoting the cover 16a. By opening the cover 16a, it is possible to turn the shaft supporting part 35 to detach the cam protrusions 36 from the cam receivers 38 and to remove the shaft supporting part 35 from the first side plate 15a.

In the second embodiment, the orientation of the guide groove 63 is also not limited to the orientation shown in FIG. 9, and the guide groove can communicate with the outer periphery of the dial disc 60 from the other end of the engagement groove 62. In that embodiment, the cover 16a is turned counterclockwise and detached from the dial disc 60.

The second embodiment is not limited to a structure in which the cover 16a is supported by the first side plate 15a with the support shaft 21, and the support shaft 21 may be formed on the shaft supporting part 35. In this embodiment, the cover 16a turns with respect to the shaft supporting part 35. In addition, in this embodiment, when the cover 16a is detached from the dial disc 60, the cover 16a can preferably be detached from the shaft supporting part 35.

Third Embodiment

Figure 10:
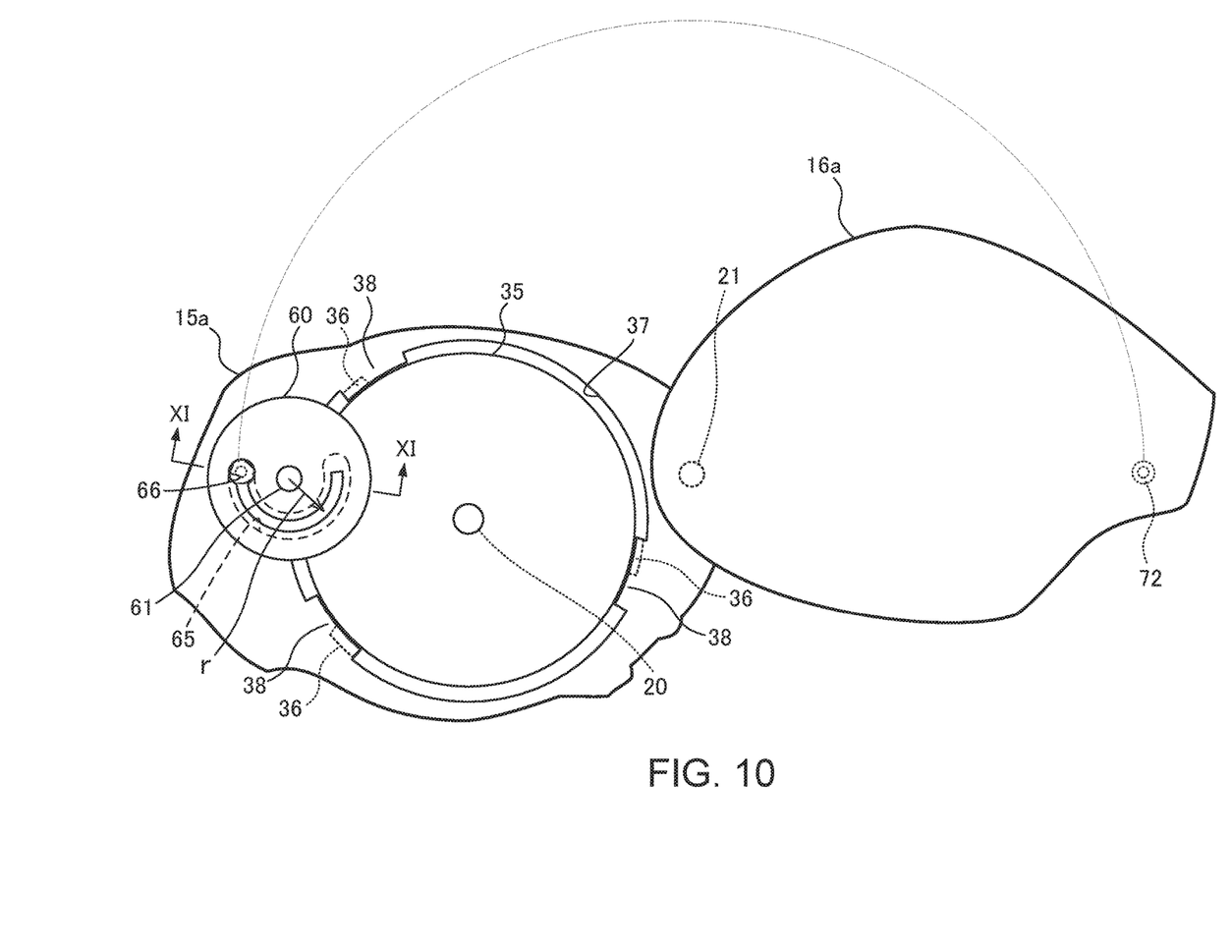
FIG. 10 is a side view in a state in which the cover of the dual-bearing reel according to a third embodiment of the present invention is opened.

FIG. 10 is a side view illustrating the dual-bearing reel according to the third embodiment of the present invention with the cover open. In the third embodiment, a projection 72 is fixed to the cover 16a and has a shape that is thickener toward the end, whereby the width of the distal end is greater than the width of the proximal end. An engagement groove 65 with a radius r centered at the axis of the central shaft 61 is formed on the dial disc 60. A cross section of the engagement groove 65 shows that the groove has a shape that is wider at the bottom, whereby the width of the bottom, with which the projection 72 engages, is greater than the width of the opening. A guide groove 66 communicates with the engagement groove 65 and with the outer surface of the dial disc 60 from one location of the engagement groove 65, and the distal end of the projection 72 can pass through the guide groove in the direction from the distal end to the proximal end of the thereof.

In the third embodiment, the cover 16a is supported by the first side plate 15a so as to be pivotable about the support shaft 21 and can move in parallel in the direction of the support shaft 21 at least in the position where the projection 72 is aligned with the guide groove 66. In the same manner as in the first embodiment, the shaft supporting part 35 is connected to the first side plate 15a by the cam protrusions 36, the engagement groove 37, and the cam receivers 38, which have a bayonet structure. The dial disc 60 is rotatably supported by the shaft supporting part 35.

Figure 11:
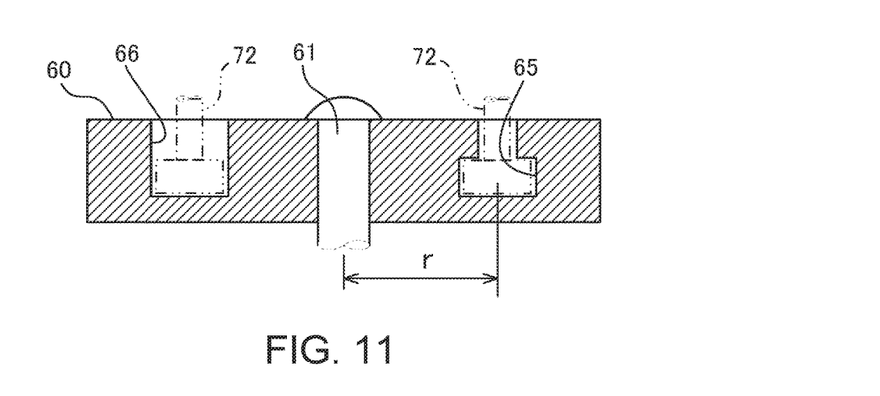
FIG. 11 is a cross-sectional view of a dial disc of the dual-bearing reel according to the third embodiment.

FIG. 11 is a cross-sectional view taken through the dial disc of the dual-bearing reel according to the third embodiment. FIG. 11 shows a section along line XI-XI of FIG. 10.

In FIG. 11, a projection 72 that engages with the engagement groove 65 or the guide groove 66 is indicated by the chain double-dashed line.

The cross section of the engagement groove 65 has the shape of an inverted T, where the width of the bottom is greater than the width of the opening, when the opening is seen as seen as opening in an upward direction. The guide groove 66 is a tubular hole that communicates with the engagement groove 65 from one location of the engagement groove 65 and communicates with the upper surface of the dial disc 60 having the width of the bottom of the engagement groove 65. The projection 72 is thicker toward the end, whereby the width of the distal end is greater than the width of the proximal end. In the third embodiment, the projection 72 has a T-shape when the distal end is viewed in an upward direction.

When the projection 72 is inserted into the guide groove 66 and the distal end reaches the bottom surface, the dial disc 60 can be turned about the central shaft 61. Since the opening of the engagement groove 65 is narrower than the bottom surface of the projection 72, when the projection engages with the engagement groove 65, the projection 72 cannot be moved in the direction of the central shaft 61. In addition, as shown in FIG. 10, the pivot locus of the projection 72 about the support shaft 21 intersects the arc of the engagement groove 65; therefore, when the projection 72 is engaged with the engagement groove 65 the cover 16a cannot be turned.

By aligning the projection 72 with the position in which the engagement groove 65 and the guide groove 66 intersect, it is possible to detach the projection 72 from the dial disc 60 through the guide groove 66. That is, it is possible to separate the cover 16a from the first side plate 15a in the direction of the support shaft 21. By detaching the projection 72 from the dial disc 60, the cover 16a can be pivoted about the support shaft 21 and opened.

Figure 12:
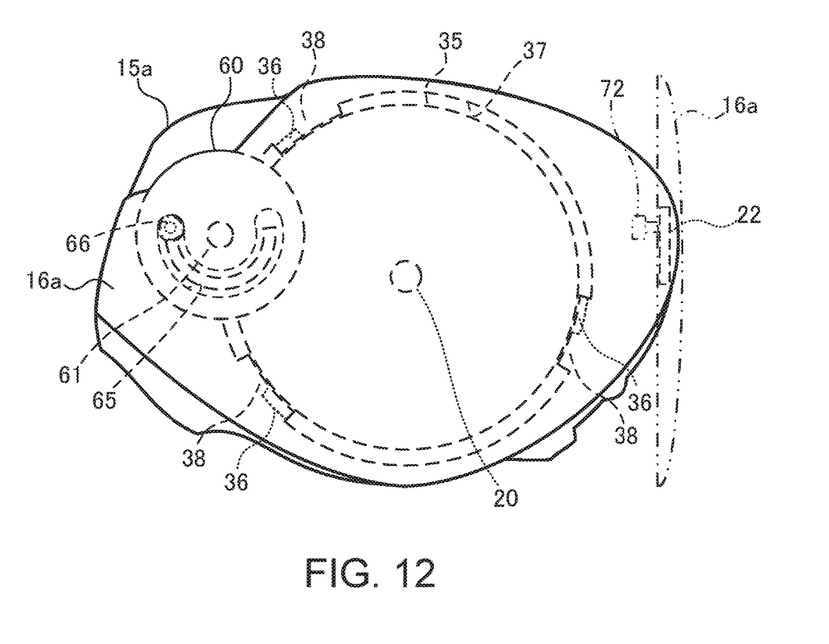
FIG. 12 is a side view showing a modified example of the third embodiment.

FIG. 12 is a side view showing a modified example of the third embodiment. In the modified example of FIG. 12, the cover 16a is supported by the first side plate 15a so as to be pivotable about a support shaft 22. The other configurations are the same as in FIGS. 10 and 11.

The direction of the support shaft 22 is the direction of the surfaces of the first side plate 15a and the cover 16a, which is in a twisted position with respect to the central shaft 61 of the dial disc 60 and the spool shaft 20. The support shaft 22 essentially acts as a hinge, and the cover 16a opens and closes in the manner of a door about the support shaft 22. In FIG. 12, the cover 16a being in the open position is indicated by the chain double-dashed line.

In the modified example of FIG. 12, the locus of the projection 72 forms an arc as seen in a section taken through the projection 72 that is orthogonal to the support shaft 22, but if there is a margin in the width of the guide groove 66, the projection can be inserted into the guide groove 66.

Figure 13:
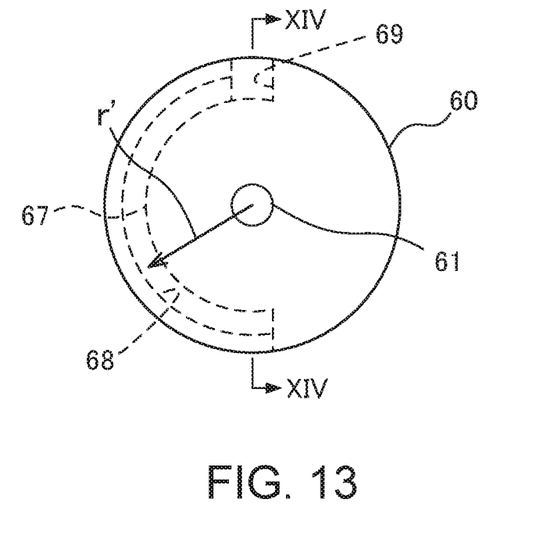
FIG. 13 is a front view of the dial disc according to a different modified example of the third embodiment.

FIG. 13 is a front view of the dial disc according to a different modified example of the third embodiment. In the example of FIG. 13, an engagement groove 67 that is recessed from the outer periphery toward the central shaft 61 and that opens onto the outer periphery is formed on the dial disc 60. The engagement groove 67 has an arc shape with a radius r' centered at the axis of the central shaft 61. The engagement groove 67 is wider at the bottom, whereby the width of the bottom, which is close to the central shaft 61, is greater than the width of the opening on the outer periphery, and a step 68 is formed in the middle of the depth of the groove. A guide groove 69 that communicates with the engagement groove 67, having a tubular shape with the width of the bottom of the engagement groove 67, and that communicates with the outer circumferential surface is formed at the end of the engagement groove 67.

Figure 14:
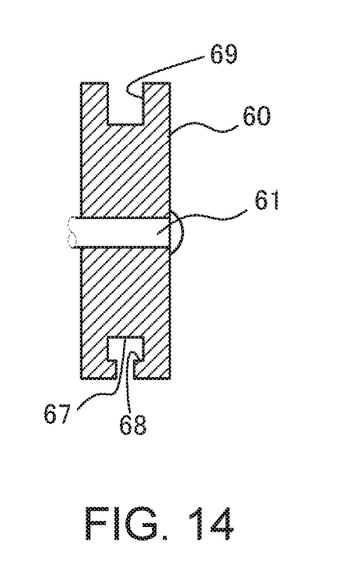
FIG. 14 illustrates a cross section of the dial disc according to a different modified example of the third embodiment.

FIG. 14 is a cross-sectional view of the dial disc according to a different modified example of the third embodiment. FIG. 14 shows a cross section taken through line XIV-XIV of FIG. 13. The cross section of the engagement groove 67 has the shape of an inverted T, wherein the width at the bottom is greater than the width of the opening, when the opening is viewed as opening in an upward direction. The guide groove 69 is tubular and communicates with the engagement groove 67 from one location of the engagement groove 67, and communicates with the outer periphery of the dial disc 60 having the width of the bottom of the engagement groove 67. The projection 72 is thicker toward the end, whereby width of the distal end is greater than the width of the proximal end. In the third embodiment, the projection 72 has a T-shape when the distal end is viewed upward.

When the dial disc 60 shown in FIGS. 13 and 14 is used, the projection that engages with the engagement groove 67 extends toward a plane that intersects the central shaft 61 of the dial disc 60 and has a shape that is thicker toward the end, whereby the width of the distal end is greater than the width of the proximal end. For example, the structure can be configured such that a projection that extends in the direction of the plane that intersects the central shaft 61 is formed on the cover 16a, and, as shown in FIG. 10, the cover 16a is supported by the first side plate 15a so as to be pivotable about the support shaft 21.

The projection can be detached from the dial disc 60 through the guide groove 69 when the projection is aligned with the position in which the engagement groove 67 and the guide groove 69 intersect, and when the cover 16a is in the position covering the outside of the frame 15 of the first side plate 15a. By turning the dial disc 60 when the projection is inserted into the guide groove 69, the projection engages with the engagement groove 67 and is restrained by the step 68 and the bottom surface of the engagement groove 67, so that the cover 16a cannot be turned.

When the dial disc 60 shown in FIGS. 13 and 14 is used, the configuration may be such that the projection can be fixed to the first side plate 15a, and the cover 16a, the shaft supporting part 35, and the dial disc 60 can be integrally attached to and removed from the first side plate 15a, in the same manner as in the first embodiment.

In the dial disc 60 shown in FIGS. 13 and 14, the opening of the engagement groove 67 is formed on the outer periphery, that is, the side surface, and it is possible to cover and hide the side surface with the first side plate 15a and the cover 16a. In this embodiment, for example, a knob may be formed on the bottom surface of the dial disc 60 with which to operate the bottom surface.

In the third embodiment, the projection 72 is not limited to the shape of a T. The projection 72 may have the shape of a F, for example, i.e., with a bent base. The cross sections of the engagement grooves 65, 67 are not limited to those in the shape of an inverted T. The cross sections of the engagement grooves 65, 67 may have the shape of an L, for example, in accordance with the projection 72.

What is claimed is:
1. A dual-bearing reel, comprising:
    a frame having a first side plate and a second side plate disposed facing the first side plate;
    a spool shaft disposed to pass through the first side plate and the second side plate and rotatably supported by the frame;

a spool disposed between the first side plate and the second side plate and configured to rotate with the spool shaft;

a cover pivotally supported about a support shaft and situated outside of the first side plate of the frame and pivotally movable between a first position that covers the outside of the first side plate of the frame and a second position that opens the outside of the first side plate of the frame;

a dial disc rotatably supported around a central shaft which is separated from the support shaft of the cover, the dial disc being disposed on one of the cover and the first side plate outside of the frame, and being configured to adjust a braking force applied to the spool based on a turning position about a center axis, and the dial disc having an engagement groove which is formed in an arc having a first radius centered around the central shaft, and a guide groove which extends from an intersection point of the engagement groove in a direction that is different from the arc of the engagement groove; and a projection disposed on an other one of the cover and the first side plate at outside of the frame, and configured to engage the engagement groove when the cover is in the first position, and configured to detach from the dial disc to disengage the engagement groove through the guide groove when the projection is aligned with the intersection point of the engagement groove.

2. The dual-bearing reel according to claim 1, wherein the guide groove is formed as an arcuate groove having a second radius centered around the support shaft of the cover and communicating with the intersection point of the engagement groove and with an outer periphery of the dial disc.

3. The dual-bearing reel according to claim 2, wherein the first side plate has a circular opening centered at an axis of the spool shaft such that the spool can pass therethrough, the dual-bearing reel further comprising a shaft supporting part detachably disposed in the opening of the first side plate and configured to pivot about the spool shaft, and configured to accommodate a shaft bearing rotatably supporting an end of the spool shaft, the cover being fixed to the shaft supporting part, the dial disc being rotatably supported by the shaft supporting part, and the projection being fixed to the first side plate.

4. The dual-bearing reel according to claim 1, wherein the projection is thicker toward one end thereof, whereby a width of a distal end of the projection is greater than a width of a proximal end of the projection, a cross section of the engagement groove is wider toward a bottom thereof, whereby a width at the bottom is greater than a width of an opening of the engagement groove and with which the projection is configured to engage, and the guide groove communicates with the engagement groove and with an outer periphery of the dial disc from the intersection point of the engagement groove, and through which the distal end of the projection is configured to pass in a direction from the distal end to the proximal end of the projection.

* * * * *